(12) United States Patent
Marie

(10) Patent No.: US 8,760,248 B2
(45) Date of Patent: Jun. 24, 2014

(54) ELECTROMAGNETIC ACTUATOR AND CORRESPONDING CONTROL DEVICE WITH HAPTIC FEEDBACK

(75) Inventor: Bruno Marie, Annemasse (FR)

(73) Assignee: DAV, Creteil (FR)

(*) Notice: Subject to any disclaimer, the term of this patent is extended or adjusted under 35 U.S.C. 154(b) by 163 days.

(21) Appl. No.: 12/937,769

(22) PCT Filed: Apr. 20, 2009

(86) PCT No.: PCT/EP2009/054681
§ 371 (c)(1),
(2), (4) Date: Oct. 14, 2010

(87) PCT Pub. No.: WO2009/130188
PCT Pub. Date: Oct. 29, 2009

(65) Prior Publication Data
US 2011/0037546 A1 Feb. 17, 2011

(30) Foreign Application Priority Data
Apr. 25, 2008 (FR) ...................................... 08 02323

(51) Int. Cl.
*H01F 7/00* (2006.01)
(52) U.S. Cl.
USPC .......................................... 335/230; 335/207
(58) Field of Classification Search
USPC ....................................................... 335/230
See application file for complete search history.

(56) References Cited

U.S. PATENT DOCUMENTS

| | | | |
|---|---|---|---|
| 5,189,660 A | 2/1993 | Caldwell | |
| 5,894,263 A * | 4/1999 | Shimakawa et al. | 340/388.1 |
| 6,347,036 B1 * | 2/2002 | Yeager et al. | 361/679.46 |
| 6,522,123 B2 | 2/2003 | Ribes | |
| 6,982,696 B1 | 1/2006 | Shahoian | |
| 7,450,110 B2 | 11/2008 | Shahoian et al. | |
| 2005/0017947 A1 | 1/2005 | Shahoian et al. | |
| 2005/0052430 A1 | 3/2005 | Shahoian et al. | |

OTHER PUBLICATIONS

International Search Report issued in PCT/EP2009/054681, mailed on Jun. 4, 2010, with translation, 4 pages.

\* cited by examiner

*Primary Examiner* — Shawki S Ismail
*Assistant Examiner* — Lisa Homza
(74) *Attorney, Agent, or Firm* — Osha Liang LLP

(57) ABSTRACT

The invention relates to an electromagnetic actuator to be mounted in a haptic-feedback control device (1) for transmitting a haptic feedback to a user, wherein said actuator (5a, 5b) comprises a fixed portion (9) and a mobile portion (11), said fixed (9) and mobile (11) portions forming a magnetic circuit defining at least one air gap (e) between said fixed (9) and mobile (11) portions. According to the invention, the actuator (5a, 5b) further comprises: at least two permanent magnets (23a, 23b) respectively generating first (B1) and second (B2) opposite magnetic fields; and an electric coil (25) provided between said magnets (23a, 23b) such that the winding of said coil (25) extends successively through said first (B1) and second (B2) opposite magnetic fields so that, when a current flows through said coil (25), the actuator (5a, 5b) is submitted to a resulting actuation force in a common driving direction for translating said mobile part (11) in said air gap (e).

13 Claims, 2 Drawing Sheets

Figure 3:
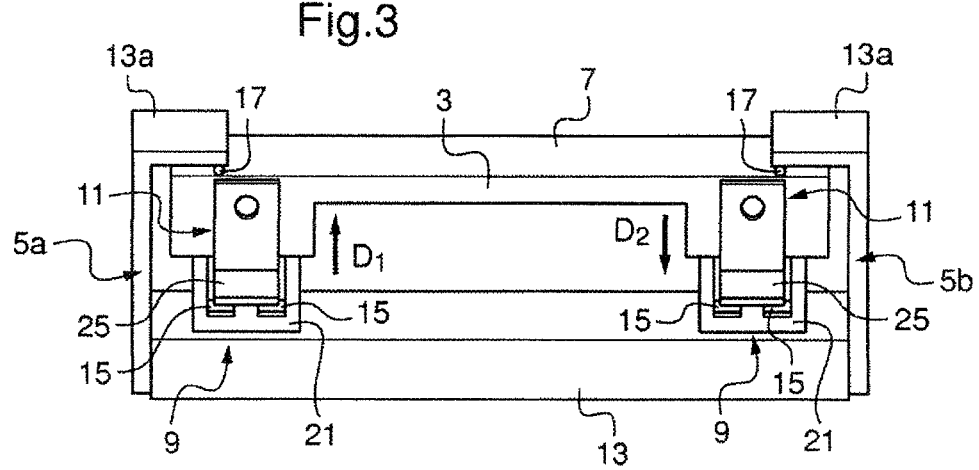

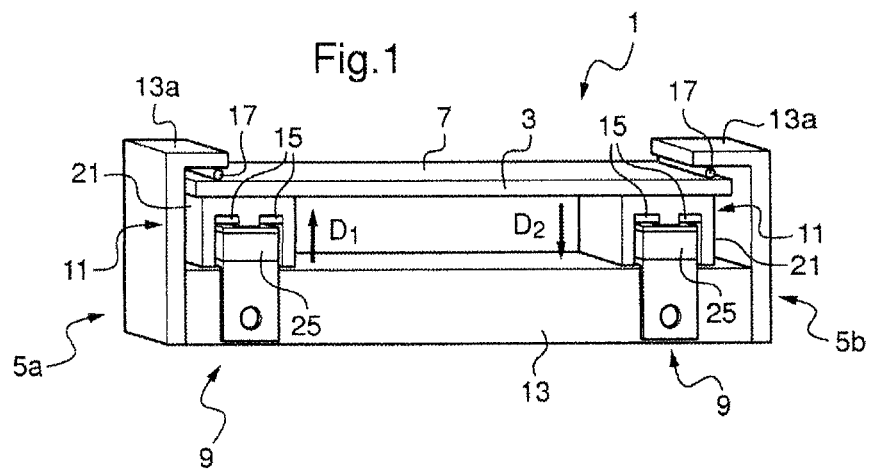
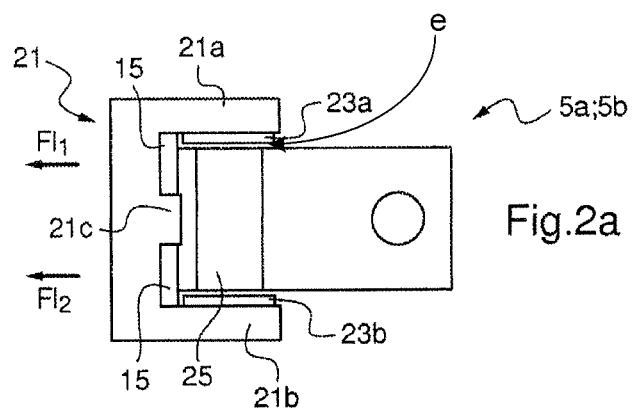
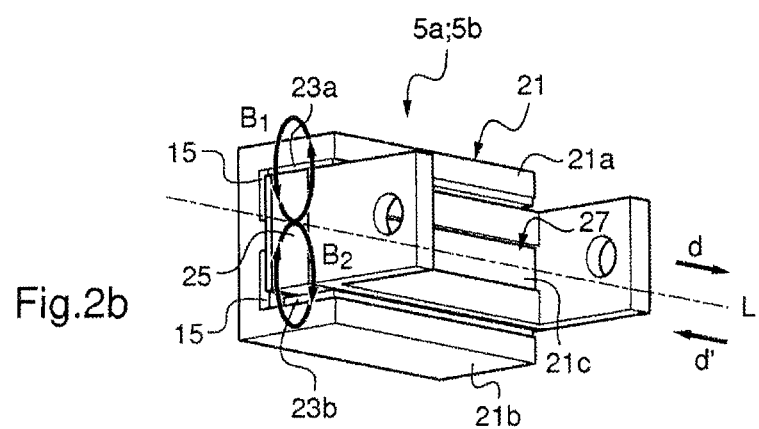

ELECTROMAGNETIC ACTUATOR AND CORRESPONDING CONTROL DEVICE WITH HAPTIC FEEDBACK

The present invention relates to an electromagnetic actuator intended to be mounted in a control device making it possible in particular to transmit a haptic feedback to a user, such as a vibratory feedback. The invention also relates to such a control device.

In the automotive sector, multifunction control devices, produced for example in the form of a joystick or a rotary knob, are increasingly used to control electrical or electronic systems, such as an air-conditioning system, an audio system or else a navigation system.

Such devices may be associated with a display screen and allow navigation around pop-up menus comprising various controls relating to the systems to be controlled.

To increase ergonomic comfort, the use of a technology with a sensor with a tactile surface at the level of the control surface of such control devices may be considered to be a beneficial development.

When a user exerts a pressure on the tactile surface of such a sensor, it is possible to measure the pressure applied and/or determine the location of the site where the pressure is exerted by applying a suitable electric voltage. In this case, a press on the tactile surface by the user is for example associated with the selection of a control command.

Furthermore, to signal to the user that his command has indeed been taken into account, in particular during night driving or when manipulating blindly, it is important that the user has haptic feedback so as to remain concentrated on the road.

For this purpose, control devices with haptic feedback are already known, comprising electromagnetic actuators, linked to a plate of the tactile-surface sensor so as to transmit a vibration motion to the plate, in such a way that the user perceives a haptic feedback informing him that his command has indeed been taken into account.

The objective of the present invention is to propose an electromagnetic actuator optimized with respect to the prior art.

For this purpose, the subject of the invention is an electromagnetic actuator intended to be mounted in a control device with haptic feedback so as to transmit a haptic feedback to a user, said actuator comprising a fixed part and a mobile part, said fixed and mobile parts forming a magnetic circuit defining at least one air gap between said fixed and mobile parts, characterized in that said actuator furthermore comprises:

at least two permanent magnets generating respectively a first and a second opposite magnetic fields, and an electric coil disposed between said magnets such that the winding of said coil successively crosses said first and second opposite magnetic fields, so that when said coil is traversed by a current, said actuator is subjected to a resultant actuation force along a common drive direction so as to drive said mobile part in translation in said air gap.

Such an electromagnetic actuator makes it possible to generate in an improved manner the actuation force to drive the mobile part in translation in the air gap so as to thus generate the haptic feedback at the level of the plate of the corresponding control device, intended to be linked to the mobile part of the actuator.

Said actuator can furthermore comprise one or more following characteristics, taken separately or in combination:

said magnets are disposed facing one another, said magnets are carried by the fixed part of said actuator and said coil is carried by the mobile part of said actuator, said magnets are carried by the mobile part of said actuator and said coil is carried by the fixed part of said actuator, the part of said actuator carrying said magnets exhibits a substantially E-shaped general form, the outer branches of which carry respectively a permanent magnet and the central branch of which forms a support for the winding of said coil, the part of said actuator carrying said coil exhibits an opening in which said central branch engages, the part of said actuator carrying said magnets is made of ferromagnetic material, said actuator comprises a damper in said air gap between said fixed and mobile parts.

The subject of the invention is also a corresponding control device with haptic feedback, said device comprising:

a plate for transmitting a haptic feedback to a user, a tactile-surface sensor carried by said plate, configured to detect a press on the tactile surface by the user, and at least one electromagnetic actuator linked to said plate and configured to drive said plate in motion when a press is detected on the tactile surface so as to generate the haptic feedback, said actuator comprising a fixed part and a mobile part, said fixed and mobile parts forming a magnetic circuit defining at least one air gap between said fixed and mobile parts, characterized in that said actuator furthermore comprises:

at least two permanent magnets generating respectively a first and a second opposite magnetic fields, and an electric coil disposed between said magnets so that the winding of said coil successively crosses said first and second magnetic fields, so that when said coil is traversed by a current, said actuator is subjected to a resultant actuation force along a common drive direction so as to drive said mobile part in translation in said air gap.

Said device can furthermore comprise one or more following characteristics, taken separately or in combination:

said device comprises at least two actuators and a processing unit linked to said sensor and configured to simultaneously and independently activate said actuators when a press is detected on said tactile surface, said actuator is configured to drive said plate along a direction substantially perpendicular to the plane defined by said plate, the processing unit is configured to independently provide a periodic supply signal to each actuator, said supply signals being 180° phase-shifted so that said actuators simultaneously drive said plate in two opposite directions, said device comprises a guidance means for said plate, formed by at least one passive actuator exhibiting a general shape substantially corresponding to that of said electromagnetic actuator.

Figure 4:
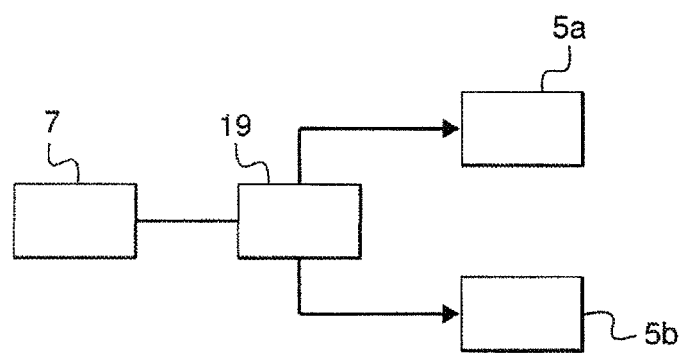

Other characteristics and advantages of the invention will emerge from the following description, given by way of example, without limiting character, with regard to the appended drawings in which:

FIG. 1 represents a first embodiment of a control device comprising at least one actuator according to the invention, FIG. 2a illustrates an actuator according to the invention, FIG. 2b is a perspective view of the actuator of FIG. 2a, and FIG. 3 represents a second embodiment of the control device, and FIG. 4 is a diagram representing elements of the control device.

The invention relates to an electromagnetic actuator for a control device with haptic feedback that is able to transmit a haptic feedback to a user having for example modified or selected a control.

The haptic feedback, for example of vibratory type, makes it possible to assure the user that the modified or selected control has been taken into account.

Such a control device can for example be arranged in a motor vehicle control panel, or else a motor vehicle central console, to control electrical or electronic systems of the vehicle.

FIG. 1 represents such a control device 1 comprising a plate 3 for transmitting a haptic feedback to a user and two actuators 5a,5b linked to the plate 3 so as to generate the haptic feedback. Of course, provision may be made for a single or several actuators.

The plate 3 carries a tactile-surface sensor 7, for example a pressure sensor using FSR ("Force Sensing Resistor") technology, that is to say using pressure-sensitive resistors. This sensor 7 makes it possible to detect a press, for example by a finger of the user, on the tactile surface.

It is also possible to choose a sensor using capacitive or optical technology to detect a press by the user.

A protective and decorative skin (not represented) may be disposed on the tactile-surface sensor 7.

The two actuators 5a,5b are for example disposed at the level of two opposite sides of the plate 3 for better distribution of the loads applied to the plate 3.

Each actuator 5a,5b is electromagnetic and comprises a fixed part 9 and a mobile part 11 linked to the plate 3.

It is possible to provide tapped holes on the fixed part 9 so as to cooperate with complementary fixing means of a fixed chassis 13 of the device 1. Of course, it is possible to envisage other means for fixing the fixed part 9 onto the chassis 13.

The fixed part 9 is disposed facing the mobile part 11 so as to delimit an air gap e between the fixed part 9 and the mobile part 11. The mobile part 11 is configured so as to be driven in translation in the air gap e in such a way as to generate the haptic feedback.

An elastic element 15 can then be arranged in the air gap e, to guide the motion of the mobile part 11. The elastic element 15 damps the motion of the mobile part 11 and avoids any physical contact between the fixed part 9 and the mobile part 11, thus limiting the noise generated during the motion of the mobile part 11.

This elastic element 15 may be made of elastomer or silicone and may be overmolded on the fixed part 9 and the mobile part 11.

So as to be compatible with automobile standards, for which the haptic feedbacks in such a control device 1 require very small displacements, the elastic element 15 can exhibit by way of example a thickness of the order of 2 mm.

Furthermore, the electromagnetic actuators 5a,5b may be disposed so as to drive the plate 3 in motion along a substantially horizontal direction with respect to the plate 3.

As an alternative (FIG. 1), the electromagnetic actuators 5a,5b are disposed so as to drive the plate 3 in motion along a direction D1 or D2 substantially vertical with respect to the plate 3, that is to say perpendicular to the plane defined by the plate 3.

In this case, provision may be made for a leaktightness means 17 interposed between the plate 3 and a part 13a of the chassis 13. This leaktightness means 17 can for example be made of elastic material, such as elastomer or silicone. This leaktightness means 17 also forms a damper of the motion of the plate along the direction D1 or D2.

Thus, the motion of the plate 3 is delimited on the one hand by the elastic element 15 between the fixed 9 and mobile 11 parts of the electromagnetic actuators 5a and 5b, and on the other hand by the leaktightness means 17.

As may be seen better in FIGS. 2a and 2b, an electromagnetic actuator 5a,5b comprises a ferromagnetic structure 21, made for example of soft iron, which carries two magnets 23a,23b and a coil 25 disposed between the two magnets 23a,23b.

The ferromagnetic structure 21 carrying the two magnets 23a,23b may be carried by the mobile part 11 of the electromagnetic actuator 5a,5b (see FIG. 1) or as a variant by the fixed part 9 of the electromagnetic actuator 5a,5b (see FIG. 3).

Likewise, the coil 25 may be carried by the fixed part 9 of the electromagnetic actuator 5a,5b (see FIG. 1) or as a variant by the mobile part 11 of the electromagnetic actuator 5a,5b (see FIG. 3).

In the embodiment illustrated in FIG. 3, the shape of the plate 3 is suitable for being fixed to the mobile part 11 carrying the coil 25. More precisely, the plate 3 exhibits at its ends two prolongations which will be fixed to the mobile parts 11.

Again referring to FIGS. 2a,2b, the two magnets 23a,23b are permanent magnets of the same polarity disposed facing one another so as to generate a first B1 and a second B2 opposite magnetic fields.

In the example illustrated, the structure 21 exhibits a substantially E-shaped general form, with two outer branches 21a,21b and a central branch 21c.

In this case, an elastic element 15 is provided in each air gap e delimited by an outer branch 21a,21b and the central branch 21c.

The outer branches 21a,21b carry a magnet 23a,23b respectively. For this purpose, the magnets 23a,23b exhibit a substantially flat shape and extend respectively along the outer branches 21a,21b.

The central branch 21c engages in an opening 27 provided in the body of the coil 25, the central branch 21c thus forming a support for the winding of the coil 25 which then successively crosses the two opposite magnetic fields B1 and B2. This central branch 21c thus furthermore ensures the mechanical guidance of the translation of the mobile part 11.

As illustrated in a schematic manner by FIG. 2b, the winding of the coil 25 is along the longitudinal axis L of the electromagnetic actuator 5a,5b in a manner perpendicular to the magnetic fields B1 and B2 created by the magnets 23a, 23b, so as to generate a translation of the plate 3 along the direction D1 or D2 perpendicular both to the longitudinal axis L and to the fields B1,B2.

Indeed, the supplying of current to the coil 25 of an electromagnetic actuator 5a,5b along a first direction d perpendicular to the first magnetic field B1 created by the magnet 23a, at the level of the upper part of the winding, generates a Laplace force F11 perpendicular both to the first magnetic field B1 and to the direction d. Likewise, the supplying of current to the coil 25 along a second direction d' opposite to the first direction d and perpendicular to the second magnetic field B2 created by the magnet 23b, at the level of the lower part of the winding, generates a Laplace force F12 perpendicular both to the second magnetic field B2 and to the direction d'. The two Laplace forces F11 and F12 generated are oriented along a common drive direction D1 and are aggregated so that the resultant actuation force drives the mobile part 11 in translation in the air gap e so as to displace the plate 3 along the direction D1.

Such an actuator 5a or 5b makes it possible to generate an actuation force alternately along two opposite directions.

In a similar manner, the supplying of current to the coil 25 of an electromagnetic actuator 5a,5b makes it possible to displace the plate 3 in translation along the direction D2, by reversing the direction of flow of the current.

Provision may furthermore be made for the device 1 to comprise at least one passive actuator exhibiting a general shape substantially similar to the electromagnetic actuator 5a,5b. The expression "passive actuator" is understood to mean the fact that this actuator does not comprise any actuation means to drive the mobile part 11 in translation in the air gap e so as to generate the haptic feedback.

This passive actuator serves as guidance for the plate 3 when the haptic feedback is generated by the electromagnetic actuator or actuators 5a,5b. The device 1 then no longer requires any additional guidance means that could cause a hyperstatic problem tending to decrease the overall efficiency of the device 1.

Moreover, the device 1 can comprise an activating unit 19 (FIG. 4) linked to the tactile-surface sensor 7 and to the electromagnetic actuators 5a,5b so as to provide an independent control signal to each actuator 1 in order to drive the plate 3 in motion, when a press is detected on the tactile surface. The control signal may be square or sinusoidal.

Provision may be made for this unit 19 to activate the actuators 5a,5b as a function of the position of the press detected on the tactile surface, more precisely as a function of position signals arising from the sensor 7.

The unit 19 can for example provide a periodic supply signal to each electromagnetic actuator 5a,5b, the supply signals being phase-shifted. The phase shift may be suited to the position of the press detected.

According to a variant embodiment, the supply signals are phase-shifted by 180° so that when the electromagnetic actuator 5a directs the plate 3 in the direction D1, the electromagnetic actuator 5b directs the plate 3 in the direction D2 opposite to the direction D1 (see FIGS. 1 and 3).

Such phase-opposition activation of the two electromagnetic actuators 5a,5b plays a toggling effect which makes it possible practically to double the acceleration and therefore to amplify the mechanical power for generating the haptic feedback. Moreover, given the small displacement travel of the mobile part 11, the user feels a uniform haptic feedback despite the toggling effect.

Provision may be made for an even number of actuators disposed facing one another pairwise and whose supply signals are reversed pairwise.

According to an alternative, the unit 19 can control the application of different voltage levels across the terminals of each actuator 1.

Of course, during a displacement of the finger on the tactile surface, provision may be made for the unit 19 to adapt the control signals as a function of the position of the finger on the tactile surface.

Thus, the haptic feedback may be generated firstly for example with phase-opposition activation along two opposite directions, and then by simultaneous activation along a common direction when the finger reaches the center of the tactile surface, and vice versa.

It is therefore understood that an electromagnetic actuator 5a,5b according to the invention and that a control device 1 comprising such an electromagnetic actuator 5a,5b makes it possible to generate in an improved manner a haptic feedback to a user in a horizontal or vertical plane with respect to the support plate 3 of the tactile surface.

The invention claimed is:

1. An electromagnetic actuator intended to be mounted in a control device with haptic feedback so as to transmit a haptic feedback to a user, wherein the control device comprises: a plate that carries a tactile-surface sensor that is configured to detect a press on a tactile surface by the user; and a chassis comprising at least one part, said actuator comprising:
   a fixed part and a mobile part, said fixed and mobile parts forming a magnetic circuit defining at least one air gap between said fixed and mobile parts;
   at least two permanent magnets generating respectively a first magnetic field and a second magnetic field opposite to the first magnetic field; and
   an electric coil disposed between said magnets such that a winding of said coil successively crosses said first and second opposite magnetic fields so that when said coil is traversed by a current, said actuator is subjected to a resultant actuation force along a common drive direction to drive said mobile part in translation in said air gap, wherein the at least one part is oriented parallel to the plate, and wherein the actuator is linked to the plate such that when the mobile part is driven in translation in the air gap as a result of the tactile-surface sensor detecting a press in the tactile surface by the user, the haptic feedback is transmitted to the user.

2. The actuator as claimed in claim 1, wherein said magnets are disposed facing one another.

3. The actuator as claimed claim 1, wherein said magnets are carried by the fixed part of said actuator and said coil is carried by the mobile part of said actuator.

4. The actuator as claimed claim 1, wherein said magnets are carried by the mobile part of said actuator and said coil is carried by the fixed part of said actuator.

5. The actuator as claimed in claim 1, wherein one of the fixed or mobile part of said actuator carrying said magnets exhibits a substantially E-shaped general form, outer branches of which carry respectively a permanent magnet and a central branch of which forms a support for the winding of said coil.

6. The actuator as claimed in claim 5, wherein the one of the fixed or mobile part of said actuator carrying said coil exhibits an opening in which said central branch engages.

7. The actuator as claimed in claim 1, wherein the one of the fixed or mobile part of said actuator carrying said magnets is made of ferromagnetic material.

8. The actuator as claimed in claim 1, wherein said actuator comprises a damper in said air gap between said fixed and mobile parts.

9. A control device with haptic feedback comprising:
   a plate for transmitting a haptic feedback to a user;
   a tactile-surface sensor carried by said plate, configured to detect a press on a tactile surface by the user;
   a chassis comprising at least one part that is oriented parallel to the plate;
   at least one electromagnetic actuator linked to said plate and configured to drive said plate in motion when a press is detected on the tactile surface so as to generate the haptic feedback, said actuator comprising a fixed part and a mobile part, said fixed and mobile parts forming a magnetic circuit defining at least one air gap between said fixed and mobile parts, wherein the plate is mounted to cover the mobile part of the at least one electromagnetic actuator;
   at least two permanent magnets generating respectively a first magnetic field and a second magnetic field opposite to the first magnetic field; and, an electric coil disposed between said magnets so that a winding of said coil successively crosses said first and second magnetic fields, so that when said coil is traversed by a current, said actuator is subjected to a resultant actuation force along a common drive direction to drive said mobile part in translation in said air gap.

10. The device as claimed in claim 9, wherein said device comprises at least two actuators and a processing unit linked to said sensor and configured to simultaneously and independently activate said actuators when a press is detected on said tactile surface.

11. The device as claimed in claim 10, wherein the processing unit is configured to independently provide a periodic supply signal to each actuator, each of said periodic supply signals being 180° phase-shifted so that said actuators simultaneously drive said plate in two opposite directions).

12. The device as claimed in claim 9, wherein said actuator is configured to drive said plate along a direction substantially perpendicular to a plane defined by said plate.

13. The device as claimed in claim 9, further comprising a guidance means for said plate, formed by at least one passive actuator exhibiting a general shape substantially corresponding to that of said electromagnetic actuator.

\* \* \* \* \*